Jan. 18, 1927.　　　　　　　　　　　　　　　1,614,634
O. O. STORLE
REVOLVING VALVE SLEEVE GAS ENGINE
Filed May 3, 1926
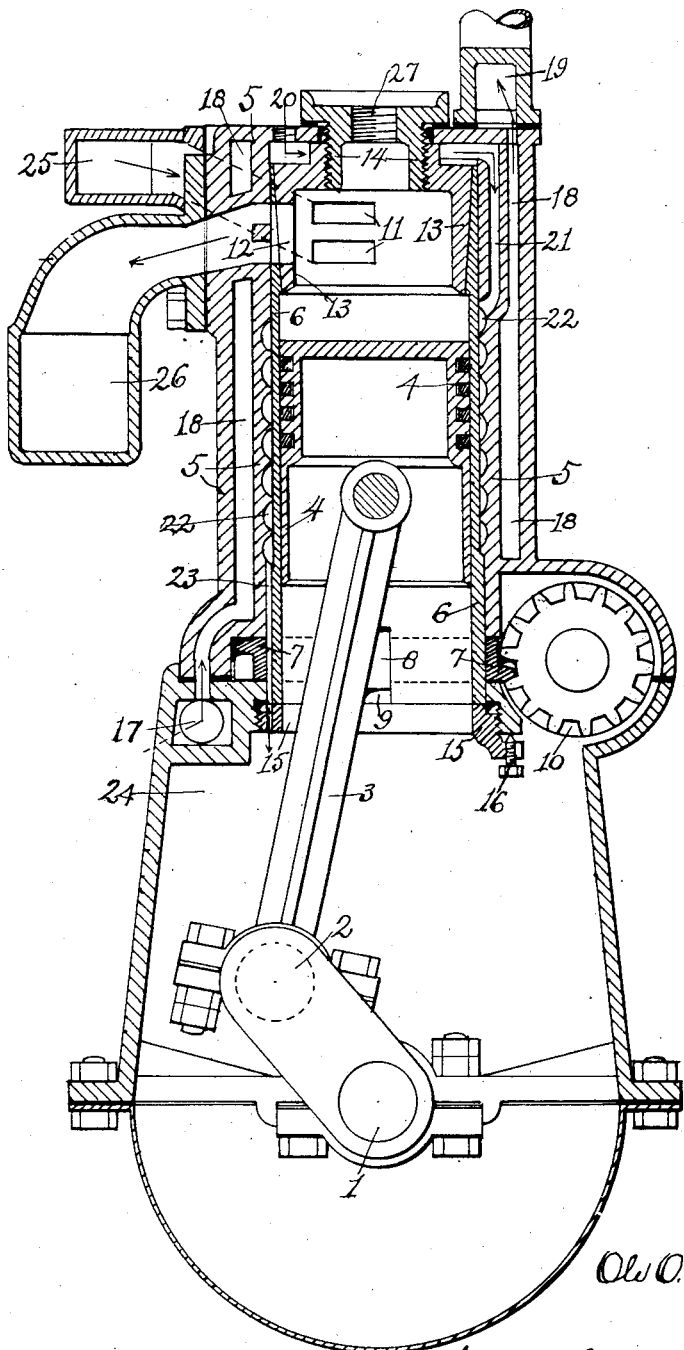
Inventor
Ole O. Storle,
By Geo. W. Bullard.
Attorney Patented Jan. 18, 1927.

1,614,634

UNITED STATES PATENT OFFICE.

OLE O. STORLE, OF TACOMA, WASHINGTON.

REVOLVING VALVE-SLEEVE GAS ENGINE.

Application filed May 3, 1926. Serial No. 106,271.

My invention relates to gas combustion engines for automobiles and other motor driven vehicles. It has for its objects, first, to provide within a cylinder a revolving valve sleeve wherein are ports for gas intake and exhaust outlet, these ports being so timed and adjusted as to operative noiseless valves without the use of spring actuated mechanism; second, to provide a gas combustion engine that is more durable, more simple in construction and more economical to manufacture and operate; and third, to reduce wear and repair on the valves by effective lubrication.

I attain these objects by means of the mechanism illustrated in the accompanying drawing composed of but one figure.

Referring to the drawing, the usual form of a gas engine is shown, in which one or more engines is designed to operate on the crank shaft 1 with its crank 2, the piston rod 3 and the piston 4 operating within the cylinder 5. My improvement comprises a revolving valve sleeve 6 within the cylinder 5. This valve sleeve is made to revolve by means of an annular worm gear 7 encircling the sleeve and having a lug engagement 8 fitted into a slot 9 in the side thereof. A spiral gear 10 made to revolve in unison with the crank shaft 1, engages the annular worm gear 7 and turns it one-half revolution to each revolution of the crank 2. The valve sleeve 6 will make but one revolution to two revolutions of the shaft 1 and crank 2.

In the sides of the top part of the revolving valve sleeve are openings so spaced and timed as to come in alignment with the gas intakes 11 and the exhaust outlets 12 as to secure a perfect valve control of the supply and exhaust of the engine when in operation. It will be seen that the revolving valve sleeve thus designed and operated will provide a noiseless and effective valve operation without using spring or otherwise operative mechanism. The interior of the top part of the valve sleeve is milled to a slight taper to receive the tapered cylinder valve head 13 in the side of which the gas intakes 11 and the exhaust outlets 12 are located. This tapered cylinder valve head is made adjustable to the taper of the revolving valve sleeve by a threaded stem-like support 14 loosely fitted in the top of the cylinder body 5. The revolving valve sleeve 6 is adjustably held in place by the annular support 15 threaded into the lower part of the cylinder body 5 and fixed by a set screw 16.

The cylinder body 5 is cooled with the usual water circulation between its inner and outer walls as will be seen in the drawing, the water entering at 17, passing thru 18 and out at 19.

The revolve valve sleeve 6 is lubricated by a circulating system about the same. The oil is supplied thru the opening at 20 into the annular space above the cylinder head 13 where the top rim of the revolving valve sleeve is constantly bathed with oil. From this annular space a duct 21 leads down the cylinder body into a spiral duct 22 continued around the inner cylinder wall 5 at the lower end of which is a duct 23 discharging into the crank case 24. The water cooling circulation in the spaces 18 will cool the oil in the spiral duct and the revolving valve sleeve as well. It will be observed the spiral duct is so designed as to allow the cylinder walls to contact the revolving valve sleeve and support the strain thereon.

It will be observed the gas supply is designed to come thru the conduit 25 and the exhaust will discharge thru the channel 26. The spark plug is to be connected thru the threaded opening 27 in the cylinder valve head support 14.

The worm gear 10 is designed to be operated by chain belt or other means from the crank shaft 1 so as to turn in unison therewith. It is to be observed that the annular worm gear 7 is to have a proportion of two to one with the worm gear 10 so as to secure a valve action for a four-cycle engine.

It will now be seen that with the gas intakes and the discharge outlets of the revolving valve sleeve being properly adjusted and timed with the ports of the cylinder valve head, as described, I attain effective and noiseless valve action without any spring actuated or other cumbersome mechanism. By this means an engine can be made more simple and economical in construction, and the wear and friction and upkeep will be reduced to a minimum.

Having described my invention, I claim—

1. In a four cycle gas engine as described and having intake and exhaust ports at the upper end of the cylinder of said engine, the combination of a rotary valve sleeve within said cylinder, said sleeve having ports at its upper end cooperating with said cylinder ports, mechanical means for revolving said valve sleeve in timed relation with said cylinder ports, and the interior of said valve sleeve tapered downwardly at its upper end to receive a tapered head, said head having ports in alinement with said cylinder ports.

2. In a four cycle gas engine as described and having intake and exhaust ports at the upper end of the cylinder of said engine, the combination of a rotary valve sleeve within said cylinder, said sleeve having ports at its upper end cooperating with said cylinder ports, means for revolving said valve sleeve in timed relation with said cylinder ports, the interior of said valve sleeve tapered downwardly at its upper end, and a tapered head having valve ports in alinement with said cylinder ports, adjustably fitted into the tapered upper end of said valve sleeve.

3. In a four cycle gas engine as described and having intake and exhaust ports at the upper end of the cylinder of said engine, the combination of a rotary valve sleeve within said cylinder, said sleeve having ports at its upper end cooperating with said cylinder ports, means for revolving said valve sleeve in timed relation with said cylinder ports, the interior of said valve sleeve tapered downwardly at its upper end, a tapered head having valve ports in alinement with the said cylinder ports within the tapered end of said valve sleeve, and said tapered head having a threaded support whereby it is securely held in neat fitting adjustment within the said tapered end of said revolving valve sleeve.

4. In a four cycle gas engine as described and having intake and exhaust ports at the upper end of the cylinder of said engine, the combination of a rotary valve sleeve within said cylinder, said sleeve having ports at its upper end cooperating with the said cylinder ports, means for revolving said valve sleeve in timed relation with said cylinder ports, the interior of said valve sleeve tapered downwardly at its upper end, a tapered head having ports in alinement with said cylinder ports adjustably fitted within the tapered end of said valve sleeve, and said valve sleeve held in place by an adjustable annular support at its lower end, said annular support being threaded to the lower end of said cylinder and held fixed with a set screw.

5. In a four cycle gas engine as described and having intake and exhaust ports at the upper end of the cylinder of said engine, the combination of a rotary valve sleeve within said cylinder, said valve sleeve adjustably held in place by a threaded annular support at its lower end, the upper end of said sleeve having ports cooperating with said cylinder ports, means for revolving said valve sleeve in timed relation with said cylinder ports, the interior of said valve sleeve tapered downwardly at its upper end, a tapered head having ports in alinement with the said ports in said cylinder adjustably fitted within the tapered upper end of said valve sleeve, and an annular oiling chamber about the top of said tapered head whereby the top end of said valve sleeve is constantly lubricated, the surplus oil overflowing into a spiral duct in the walls of said cylinder to lubricate the sides of said rotary valve sleeve.

OLE O. STORLE.